(12) United States Patent
Petit

(10) Patent No.: US 8,165,721 B2
(45) Date of Patent: Apr. 24, 2012

(54) INTELLIAIRE CLIMATE CONTROLLER

(76) Inventor: John Alexander Petit, Watertown, NY (US)

( * ) Notice: Subject to any disclaimer, the term of this patent is extended or adjusted under 35 U.S.C. 154(b) by 0 days.

(21) Appl. No.: 13/251,284

(22) Filed: Oct. 2, 2011

(65) Prior Publication Data

US 2012/0031606 A1   Feb. 9, 2012

(51) Int. Cl.
G06F 19/00 (2011.01)
(52) U.S. Cl. .......................... 700/276; 700/275
(58) Field of Classification Search .................. 700/275, 700/276
See application file for complete search history.

(56) References Cited

U.S. PATENT DOCUMENTS 7,274,975 B2 * 9/2007 Miller ........................... 700/295
7,774,102 B2 * 8/2010 Butler et al. .................. 700/276
2006/0276938 A1 * 12/2006 Miller ........................... 700/295
2009/0065597 A1 * 3/2009 Garozzo et al. ................. 236/51
2009/0261174 A1 * 10/2009 Butler et al. .................... 236/51
2010/0211224 A1 * 8/2010 Keeling et al. ................ 700/277

* cited by examiner

Primary Examiner — Michael D Masinick

(57) ABSTRACT

A user interface for climate control. The purpose is to save energy by bringing in fresh air at times when the outdoor air temperature is more desirable than the indoor temperature. Primarily the user chooses their own savings; during the hot seasons energy is saved by cooling the location cooler than the desired temperature; the greater the parameter chosen the greater the efficiency. If the desired inside temp is 70 and the night time low is 50 and you accept that then the location will cool to the lowest temperature you allow causing your air conditioner to come on much later in the day; if at all depending on parameters set. It works the same way in cold seasons, only in reverse. allowing you to freshen your indoor air. The interface can be set up to operate all air handling systems, exhaust fans, intake fans, furnaces air conditioners, ERV's etc.

6 Claims, 5 Drawing Sheets

INTELLIAIRE CLIMATE CONTROLLER

BACKGROUND OF THE INVENTION

Over the years many improvements have been made to heating, air conditioners, air exchanger's, evacuation fans and the like. Efficiency has been a great priority as has been the quality of the air we breathe. Very little has been done to utilize nature itself as our ally it has rather dealt with it as an adversary. My system changes all that, nature gives us cool nights during the hot weather and nice days during the cold seasons- this is wasted energy which my system will harness.

SUMMARY OF THE INVENTION

The controller will be set up with all available air handling units on the premise where it is located and will optimize their efficiency by utilizing natures own efficiency. Even greater efficiency can be achieved by drawing air in through underground sealed duct work (preferably below the frost line) thus using the earths neutralizing temperature. When the user inputs the desired parameters the controller goes to work turning on and off the connected apparatus to achieve the desired results with the greatest efficiency possible. The outdoor sensor communicates with the controller the outdoor temperature, the indoor sensor communicates the indoor temperature then the controller reads the parameters set by the user and then communicates with the appropriate apparatus to turn it on and or off at the desired times. Though old technology can be used newer technology can be used with greater efficiency. A touch pad with digital, liquid crystal, LCD, LED, or any other available display system would allow the user to set, view and control their desired parameters.

DESCRIPTION OF DRAWINGS AND THEIR FUNCTIONS

Figure 1:
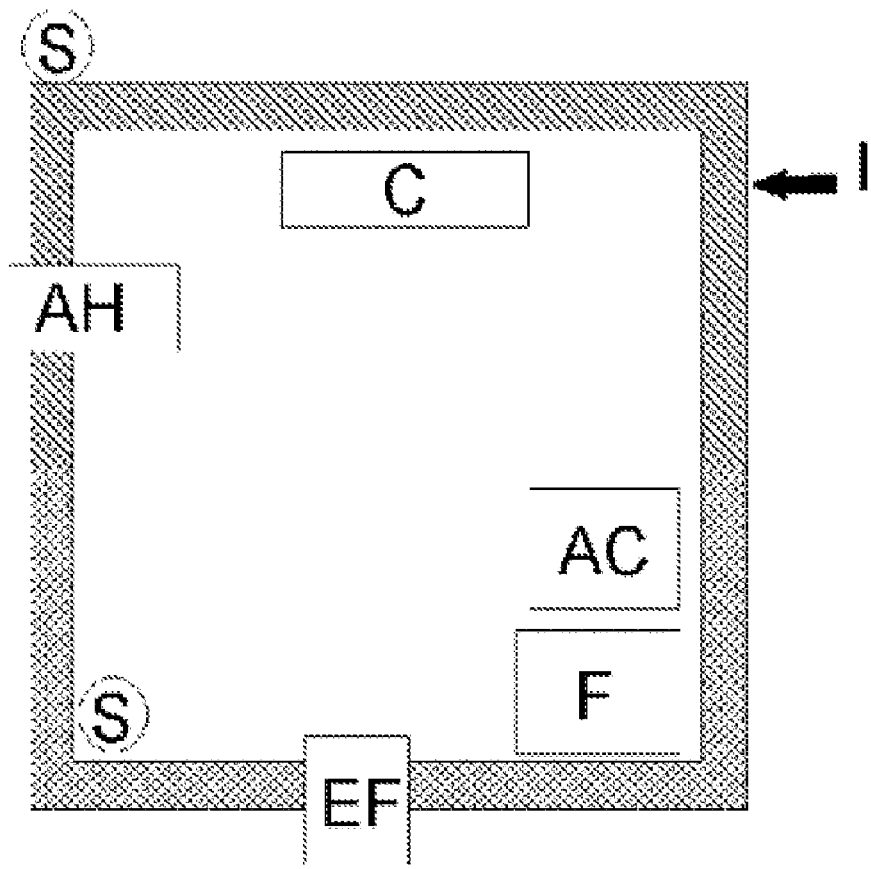
Figure 2:
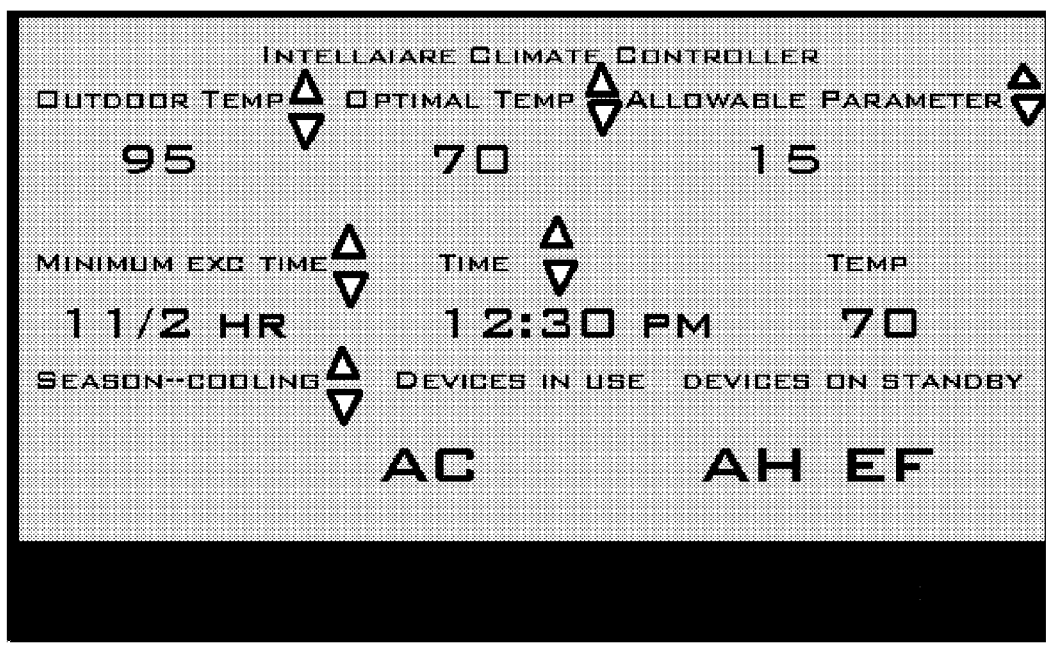
Figure 3:
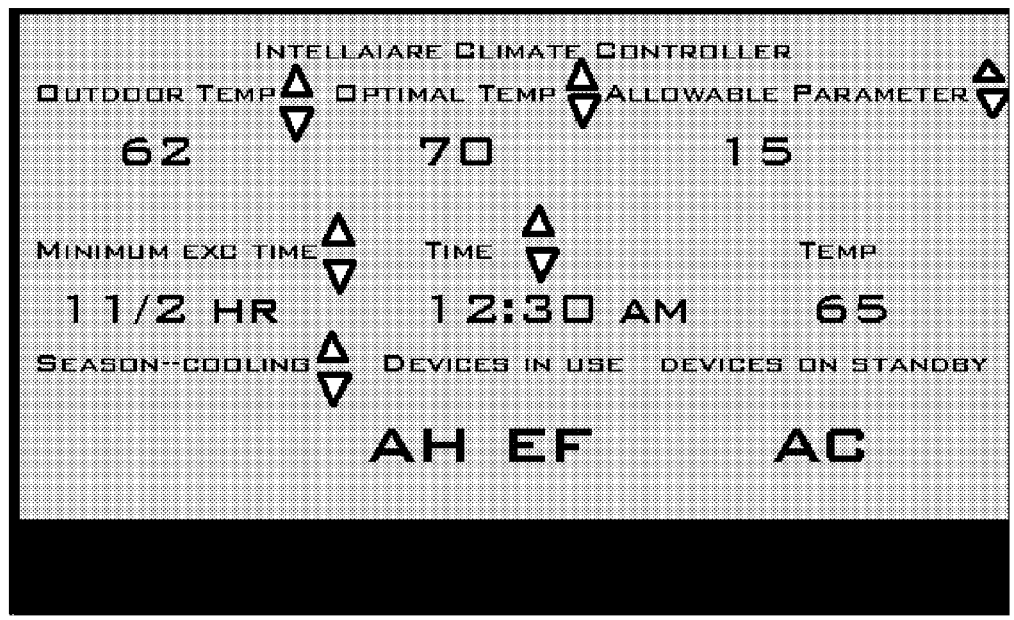
Figure 4:
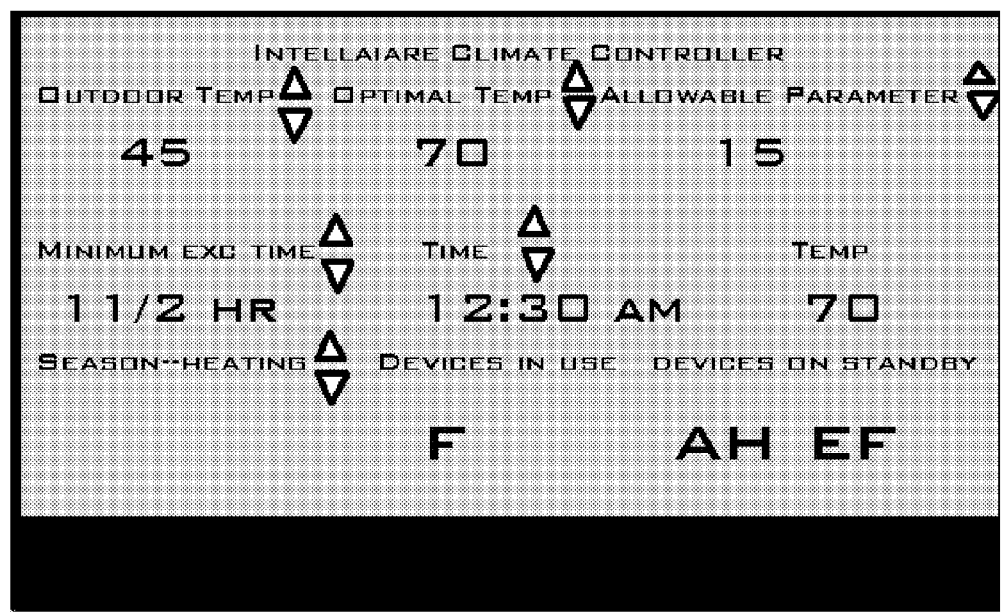
Figure 5:
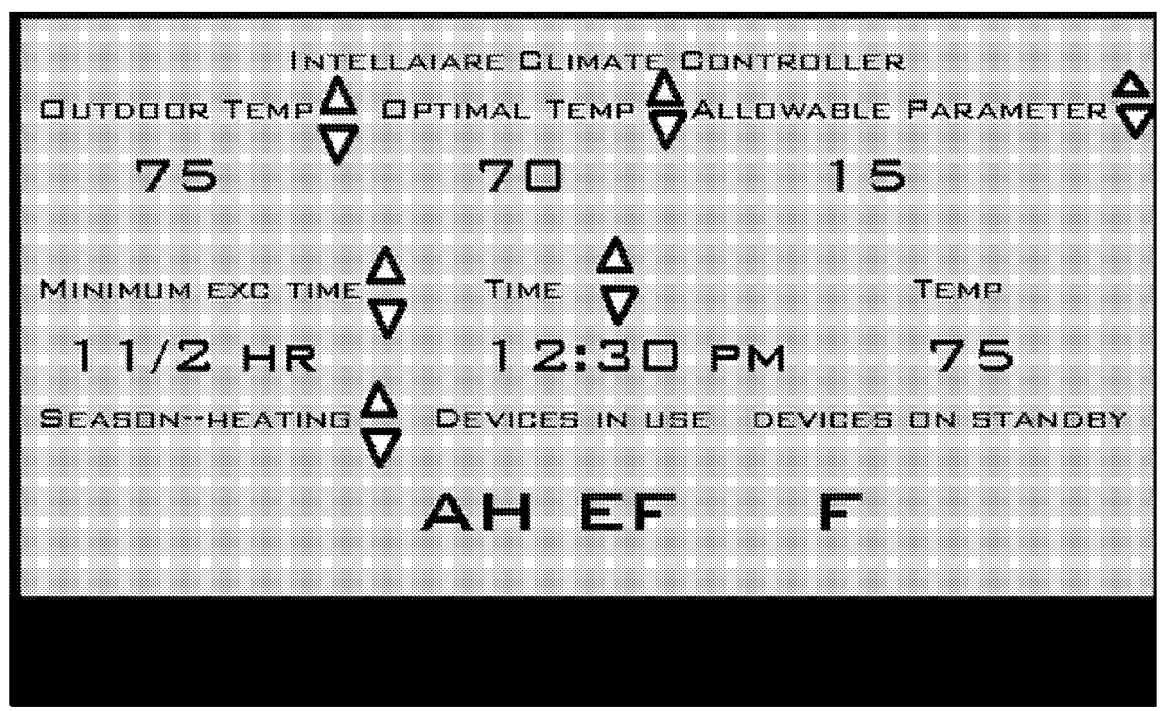

FIG. 1 is an example of a possible configuration. S is a temp. sensor, I points to an insulated wall. C is the Intelliaire Climate Controller AH is an air handler or exchanger, EF is an exhaust fan, AC is the air conditioner and F is the furnace. With C in place it reads the temp sensors and turns on and off the connected apparatus. FIG. 2-5 are sample possible images of the controller—keep in mind any variety of technologies can be used. FIG. 2 shows the unit in operation during a cooling cycle—during the heat of the day the control runs the AC, if there was a cool spell during the day it would switch off the AC and turn on the AH and EF. FIG. 3 shows the unit in operation during the cool of the night during the cooling season. The AH and EF are exchanging the cooler night air into the building. The inside temp has lowered to 65 and will continue to drop to the 15 degree parameter, down to as low as 55 degrees if the night air reaches that low. Once the lowest parameter is reached the control shuts everything off. If the inside temp rises above the preset parameter, and it is still cooler outside the control would call for more exchange. As long as the control has exchanged the minimum exchange time it will not call for AH or EF until the next cycle. If the temp in the building rises above the optimal temp, and no cooler air is available from outside it will turn on the AC. FIGS. 4 & 5 are illustrative of the heating season. The user sets in their own optimal temp, allowable parameters, minimum exchange time, heating or cooling season and sets the time. FIG. 4 shows a cycle during a night time heating cycle where the nigh time temps are cold. FIG. 5 shows a heating season session where it has warmed up during the day so the exchanger's are bringing in the nice afternoon air heating the building up above the optimal temp up to the allowable parameters.

During both the cooling and heating seasons the control unit saves energy and the environment as well as money for the user. It uses natures own energy to make the indoor environment more comfortable.

What is claimed is:

1. A self-contained user interface for setting energy saving setpoints to encourage energy savings inside an indoor space, the unit comprising:
    a switch for selecting between a heating mode and a cooling mode;
    a temperature setpoint interface for setting a desired temperature for the space;
    an allowable parameter setpoint interface for setting an allowable parameter for the space, wherein the allowable parameter is an indication of the number of degrees that the user will allow the temperature to exceed the desired temperature;
    a minimum exchange time setpoint interface for setting a minimum time that outdoor air will be exchanged;
    a time setting interface;
    at least one indoor temperature sensor for sensing the temperature in the space;
    at least one outdoor temperature sensor for sensing the temperature outdoors;
    wherein in the cooling mode the allowable parameter is subtracted from the desired temperature to find the allowable second temperature, and in the heating mode the allowable parameter is added to the desired temperature to find the allowable second temperature;
    in the cooling mode:
        if the temperature of the outdoor sensor is lower than the temperature of the indoor sensor and the second setpoint has not been reached, controlling an air exchanger to bring outdoor air indoors until the second setpoint or the outdoor temperature is reached,
        if the temperature of the outdoor sensor is higher than the first setpoint, an air conditioning system is activated;
    in the heating mode:
        if the temperature of the outdoor sensor is higher than the temperature of the indoor sensor and the second setpoint has not been reached, controlling an air exchanger to bring outdoor air indoors until the second setpoint or the outdoor temperature is reached,
        if the temperature of the outdoor sensor is lower than the first setpoint, a heating system is activated; and
    if the controller has exchanged the minimum exchange time it will not call for air exchange until a next cycle.

2. The energy savings system as shown in claim 1, wherein the user interface is a mechanical apparatus.

3. The energy savings system as shown in claim 1, wherein the user interface is a digital apparatus.

4. The energy savings system as shown in claim 1, wherein the user interface can be accessed and controlled via the internet.

5. The energy savings system as shown in claim 1, wherein the energy savings unit is installed in an individual product to increase efficiency.

6. The energy savings system as shown in claim 1, wherein the temperature sensors are hardwired or wireless.

* * * * *